UNITED STATES PATENT OFFICE.

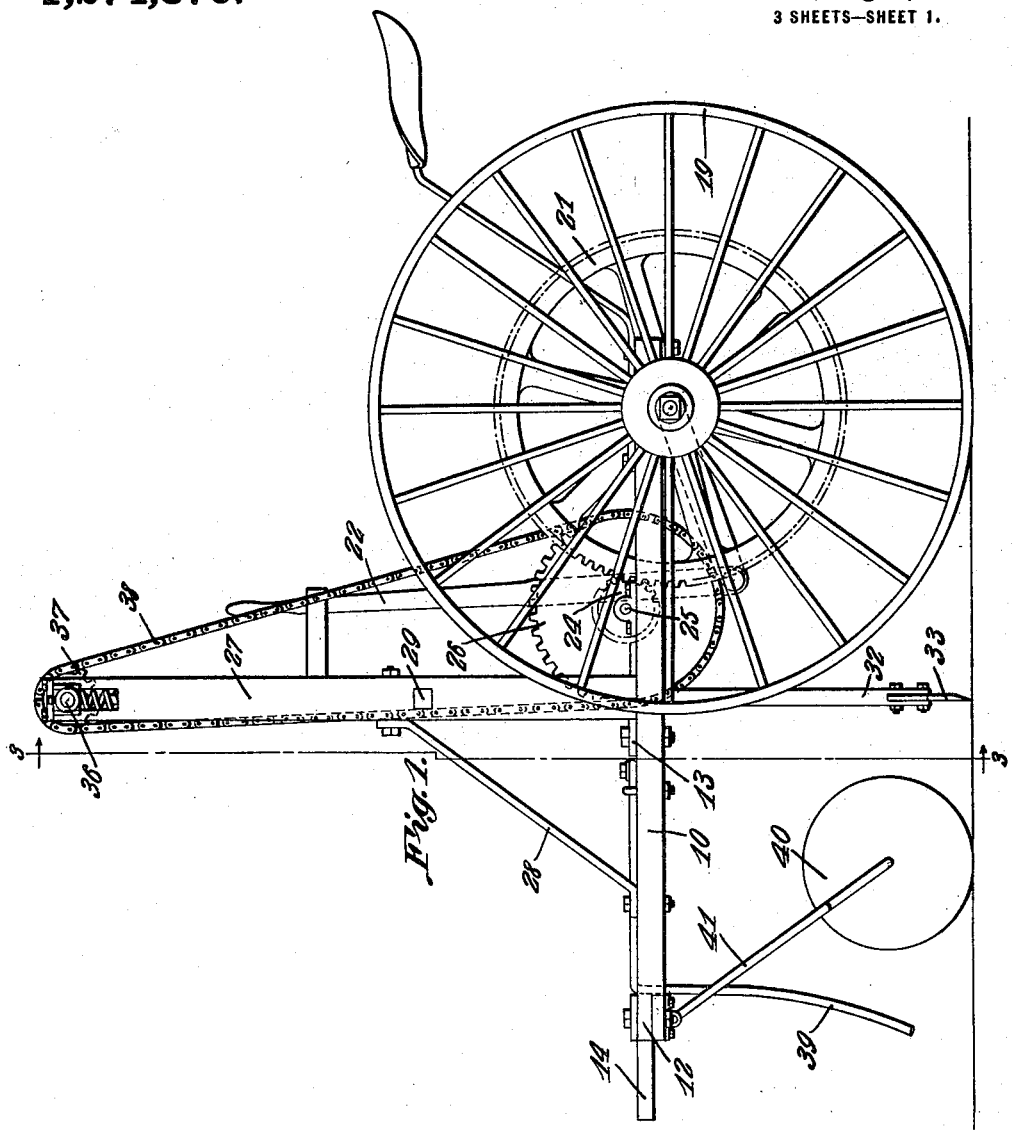

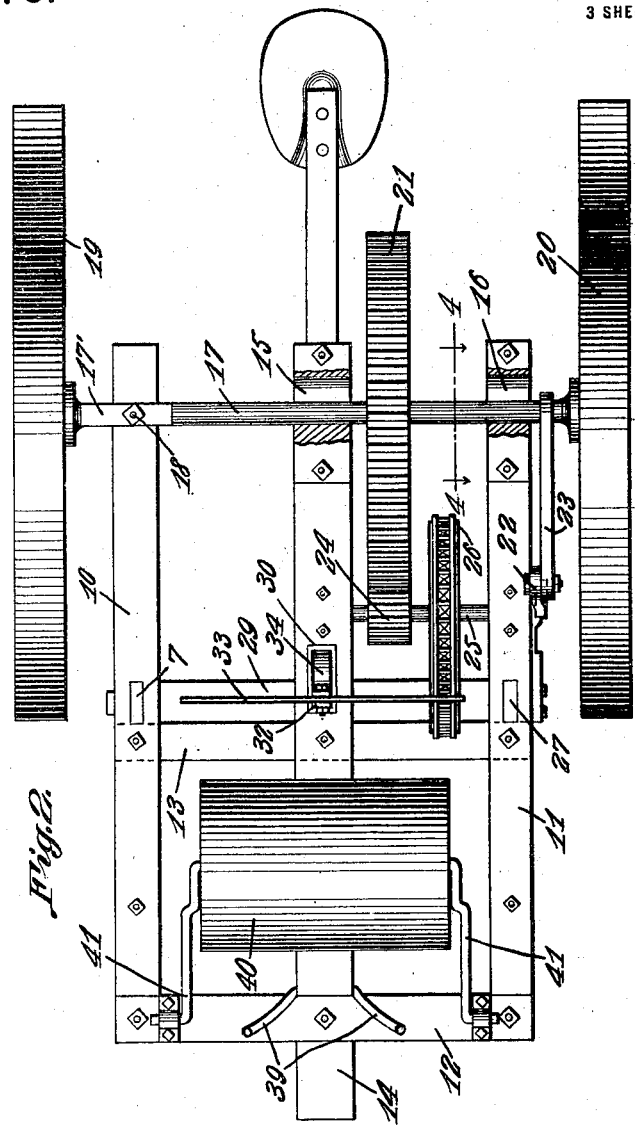

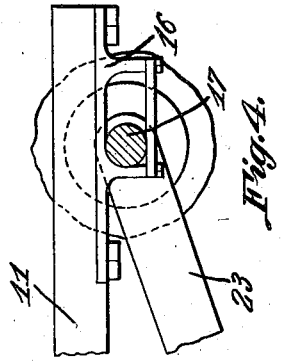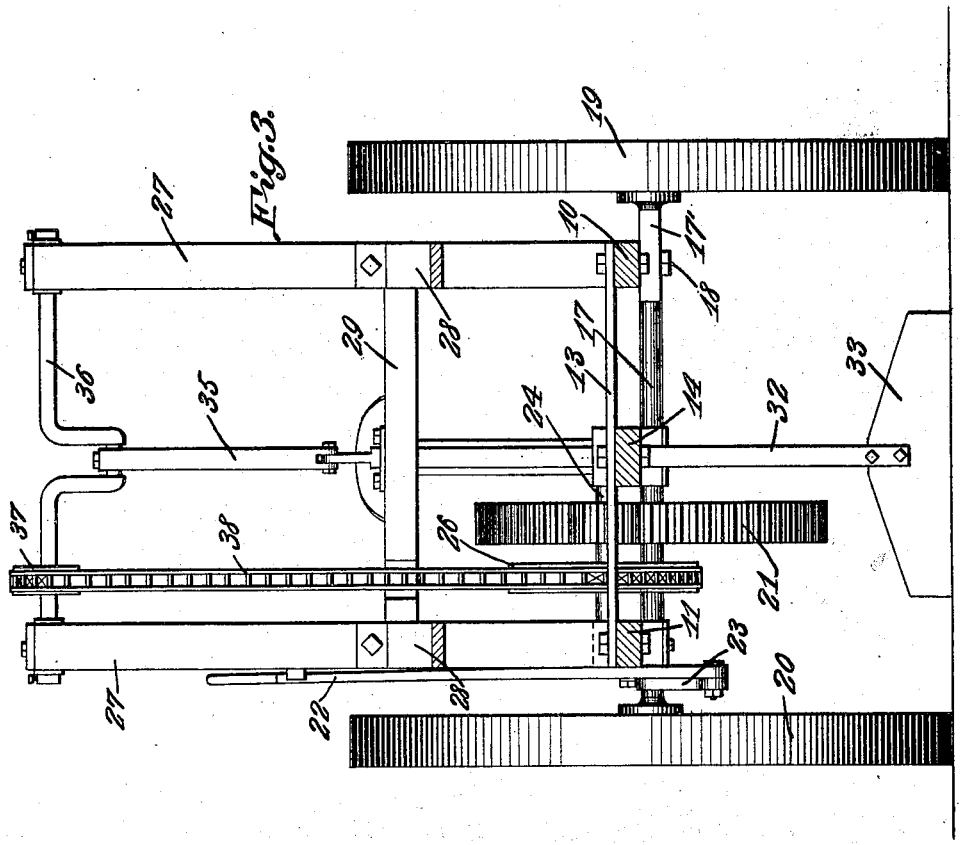

GEORGE W. GULLETT, OF MEIGS, GEORGIA.

STALK-CHOPPING MACHINE.

1,274,876.   Specification of Letters Patent.   Patented Aug. 6, 1918.

Application filed January 16, 1917, Serial No. 142,745. Renewed June 1, 1918. Serial No. 237,833.

*To all whom it may concern:*

Be it known that I, GEORGE W. GULLETT, a citizen of the United States, residing at Meigs, in the county of Thomas and State of Georgia, have invented certain new and useful Improvements in Stalk - Chopping Machines, of which the following is a specification.

This invention relates to an improved stalk chopping machine for severing the stalks of cotton, corn or any other growing plant and the principal object of the invention is to provide a stalk chopper or cutter in which there will be provided improved means for imparting vertical reciprocating movement to the blade carrying shaft or bar and to further so construct this machine that the power may be received from the axle, carrying the supporting wheels.

Another object of the invention is to so construct the transmission forming part of the machine that the axle forming the main driving shaft thereof may be swung into and out of an operative position with respect to a driving shaft forming part of the transmission.

Another object of the invention is to construct a machine of the character described which will be provided with gathering arms and a compressing or flattening roller, the gathering arms holding the plant in a compact mass and the roller then engaging the plant and holding it upon the ground while the chopping knife cuts the plant.

Another object of the invention is to provide a machine of the character described which will be very efficient in operation but at the same time will be comparatively simple in construction.

This invention is illustrated in the accompanying drawings, wherein:—

Figure 1 is a view showing the improved stalk chopper in side elevation,

Fig. 2 is a bottom plan view of the improved machine,

Fig. 3 is a vertical transverse sectional view of the machine taken along the line 3—3 of Fig. 1, Fig. 4 is a fragmentary view in section taken along the line 4—4 of Fig. 2.

The frame or carriage is provided with side bars 10 and 11 which are connected by the cross bars 12 and 13, the cross bars carrying the tongue 14, the rear end portion of which carries an elongated bearing 15 positioned in alinement with a similar bearing 16 carried by the side bar 11 of the main frame of the machine. The axle 17 which constitutes the main driving shaft of this machine is formed in two sections, the main section being slidably and rotatably mounted in the bearings 15 and 16 and the auxiliary section 17' being pivotally connected with the side bar 10 by means of the bolt 18 serving as a pivot pin. The supporting wheels 19 and 20 are mounted upon the axle and the wheel 20 will be rigid with the axle so that as this wheel rotates, the main section of the axle will be rotated with it. Therefore the large driving gear 21 will be rotated when the machine is in movement and when the adjusting lever 22 is moved to draw upon the link 23 and swing the axle to bring the large gear 21 into engagement with the relatively small gear 24, rotary movement will be imparted to the driven shaft 25 upon which the gear 24 is mounted. This driven shaft 25 further carries a sprocket wheel 26, the purpose of which will be hereinafter brought out.

Standards 27 are carried by the side bars 10 and 11 and are braced by the straps 28 and carry a cross bar 29 which is provided with an opening positioned above an opening 30 formed in the tongue 14. The shaft or handle 32 for the cutting blade 33 passes through the openings of the tongue 14 and cross bar 29 and engages a roller 34 so that the shaft may have easy movement when the machine is in operation. The upper end portion of this shaft 32 is connected with a pitman 35 carried by a crank shaft 36 mounted in bearings at the upper ends of the standards 27 and carries a sprocket wheel 37 about which passes a sprocket chain 38 which also passes about the sprocket wheel 26 of the driven shaft 25.

When this machine is in use, it is driven across the field straddling the row of plants or stalks to be chopped and if this machine is being used for chopping cotton plants or similar plants, the side flanges will be engaged by the forks 39. The roller 40 carried by the hanger arms 41 will then pass over the plants or stalks thus holding them flat upon the ground so that they may be easily cut by the knife which will rapidly travel up and down. It will of course, be obvious, that as the machine moves forwardly with the latch lever moved to bring the gear 21 into engagement with the gear 24, rotary movement will be imparted to the crank shaft 36 and as this crank shaft 36 rotates, reciprocating movement will be transmitted to the blade carrying shaft 32 through the medium of the pitman 35, and therefore, this blade carrying shaft 32 will be rapidly reciprocated thus bringing the knife into and out of a position for chopping the stalks. By moving the latch lever to shift the axle and draw the gear 21 out of engagement with the gear 24, the chopper can be rendered inoperative and the machine can then be driven without the chopper in actuation and thus wear upon the machine will be prevented when not necessary. I have thus provided a machine which will be very simple in construction but which will be very efficient in operation, the chopping knife reciprocating very rapidly thus doing away with danger of a plant being missed and further permitting the plants to be cut into small sections so that it can be easily plowed under.

What is claimed is:—

1. A stalk chopping machine comprising a carriage, standards carried by said carriage, a cross bar carried by said standards, a tongue carried by said carriage, an axle rotatably and movably connected with said carriage and constituting a driving shaft, a rotatably mounted driven shaft, gears carried by the driving shaft and driven shaft, means for adjusting said driving shaft to move the gear thereof into and out of engagement with the gear of the driven shaft, a chopping blade, a handle for said chopping blade slidably carried by said tongue and cross bar, a crank shaft rotatably carried by said standards, a pitman carried by said crank shaft and engaging the handle of said chopping blade for imparting reciprocating movement to the handle as said crank shaft rotates, and means for transmitting rotary movement from the driven shaft to the crank shaft.

2. A stalk chopping machine comprising a carriage including a tongue, having an opening formed therein, standards carried by said carriage, a cross bar connecting said standards and provided with an opening positioned above the opening of said tongue, a chopping blade, a handle for said chopping blade slidably mounted in the opening of said tongue and cross bar, a crank shaft carried by said standards, a pitman connected with said handle and mounted upon said crank shaft, a driving shaft carried by said frame, and means for imparting rotary movement from said driving shaft to said crank shaft.

3. A stalk chopping machine comprising a carriage, standards carried by said carriage, a crank shaft rotatably carried by said standards, elongated bearings carried by said carriage, a driving shaft slidably and rotatably mounted in the elongated bearings and pivotally mounted at one end, a driven shaft, means for moving said driving shaft into and out of an operative position with respect to the driven shaft, means for transmitting rotary movement from the driving shaft to the driven shaft when the driving shaft is moved to an operative position, a reciprocating cutter, means for transmitting movement from the crank shaft to the reciprocating cutter, and means for transmitting rotary movement from the driven shaft to the crank shaft.

4. A machine of the character described including an actuating shaft, a rotatably mounted driven shaft, means for transmitting rotary movement from the driven shaft to the actuating shaft, a driving shaft pivotally mounted adjacent one end, means for transmitting rotary movement from the driving shaft to the driven shaft when the driving shaft is in operative relation to the driven shaft, and means for swinging said driving shaft into and out of operative relation to the driven shaft.

In testimony whereof I affix my signature in presence of two witnesses.

GEORGE W. GULLETT.

Witnesses:
J. A. DUREN,
J. C. SMITH.

Copies of this patent may be obtained for five cents each, by addressing the "Commissioner of Patents, Washington, D. C."